(12) United States Patent
Levola

(10) Patent No.: US 7,184,615 B2
(45) Date of Patent: Feb. 27, 2007

(54) ELECTRICALLY TUNABLE DIFFRACTIVE GRATING ELEMENT

(75) Inventor: Tapani Levola, Tampere (FI)

(73) Assignee: Nokia Corporation, Espoo (FI)

( * ) Notice: Subject to any disclaimer, the term of this patent is extended or adjusted under 35 U.S.C. 154(b) by 136 days.

(21) Appl. No.: 10/666,926

(22) Filed: Sep. 19, 2003

(65) Prior Publication Data

US 2004/0109234 A1  Jun. 10, 2004

(30) Foreign Application Priority Data

Sep. 19, 2002  (FI) ................................. 20021669

(51) Int. Cl.
*G02B 6/34* (2006.01)
*G02B 6/26* (2006.01)

(52) U.S. Cl. .............................. 385/8; 385/10; 385/16; 385/31; 385/37

(58) Field of Classification Search .................. 385/16, 385/31
See application file for complete search history.

(56) References Cited

U.S. PATENT DOCUMENTS

| 5,459,799 | A | | 10/1995 | Weber | |
|---|---|---|---|---|---|
| 5,771,321 | A | * | 6/1998 | Stern | 385/31 |
| 6,188,462 | B1 | * | 2/2001 | Lavrentovich et al. | 349/201 |
| 6,747,285 | B2 | * | 6/2004 | Schueller et al. | 250/573 |
| 2004/0201891 | A1 | * | 10/2004 | Schrader | 359/558 |
| 2004/0218137 | A1 | * | 11/2004 | Lee et al. | 349/178 |

FOREIGN PATENT DOCUMENTS

| EP | 0479085 | 4/1997 |
|---|---|---|
| WO | 8705125 | 8/1987 |
| WO | 9952002 | 10/1999 |

\* cited by examiner

*Primary Examiner*—Frank G. Font
*Assistant Examiner*—Eric Wong

(57) ABSTRACT

The invention relates to an optical device (50) for manipulating a light wave ($\lambda$) using a diffractive grating structure (G). According to the basic idea behind the invention a prior art type diffractive grating structure having a permanently shaped surface relief is substituted with an electrically deformable diffractive grating structure (G), where a preformed, basic surface relief of the grating is composed of dielectric and deformable viscoelastic material, which can be electrically and sequentially fine tuned in shape to adjust the diffraction properties of said grating individually for different wavelengths. The invention permits manufacture of virtual display devices with a significantly larger exit pupil diameter than prior art solutions without degrading the color uniformity of the display device.

20 Claims, 3 Drawing Sheets

PRIOR ART

ELECTRICALLY TUNABLE DIFFRACTIVE GRATING ELEMENT

CROSS-REFERENCE TO RELATED APPLICATIONS

This application claims priority under 35 USC §119 to Finnish Patent Application No. 20021669 filed on Sep. 19, 2002.

1. Field of the Invention

The present invention relates to an electrically tunable optical diffractive device comprising a light-transmittive substrate for guiding a light wave within the substrate and a diffractive grating structure carried by said substrate and arranged to couple the energy of the light wave between the substrate and the surroundings.

2. Background of the Invention

Display technology is one of the key elements in current development of new portable devices, which today typically feature wireless connectivity for voice and data access—and that will include a display for viewing, for example, text, graphics and different types of multimedia. The displays of such portable devices need to be increasingly capable of reproducing high quality color still images and also live color video. Such devices include, for example, advanced mobile phones and portable Internet appliances.

Many portable products are dominated by the display—both physically and from the cost perspective. The fact is that almost all other electronic components in such devices are shrinking in size except the display. The use of a microdisplay-based system instead of a large size direct view display panel promises one possible way to get over these limitations. Microdisplay-based systems may be generally defined as systems where the image produced by an image source has to be magnified for viewing. Generally, such microdisplay-based systems are driven by small, high-resolution integrated circuit display chips, but other configurations are possible too.

Microdisplays offer designers a chance to increase the displayed image size and resolution, yet physically shrink the size of the image source itself. In many cases, the smaller the image source, the lower the cost. So, not only do microdisplays promise to lower system costs, but their physically smaller size will mean less bulky and heavy products and smaller power consumption, that is they will operate longer with the same battery source. With a microdisplay-based system high pixel densities may be achieved. Many direct view flat-panel displays for instance, produce full colour pixels at only 3–4 lines/mm. Many microdisplay-based systems can provide full colour pixels at 50–100 lines per mm.

Microdisplay-based systems can be generally divided into two classes: projection display systems and virtual display systems.

Projection display systems create a real image on a screen. Suitable imaging optics magnify and project an image that is created on a display chip embedded within a projector.

Virtual microdisplay-based systems also use imaging optics to magnify an image, but to create a virtual image instead of a projected real image. A virtual image is what one sees when looking in an electronic viewfinder of a digital video camera, for example. The virtual image appears to be larger and floating at some distance from the eye of the observer—even though it is created by a small sized integrated display chip acting as the image source. Virtual displays, which are kept close to the eye, can be monocular or binocular. Other types of virtual displays are, for example, Head Up Displays (HUDs), where the imaging optics are located further away from the eye.

An important and well-known aspect in virtual display devices, as also in many other optical systems, is the exit pupil diameter of the system. The diameter and also the location of the exit pupil are of considerable practical importance defining largely the overall usability of the virtual display device. In visual instruments, including virtual displays, the observer's eye needs to be positioned at the center of the exit pupil located behind the optical system in order to see the image with full field-of-view. In other words, the exit pupil is like a window, through which the virtual image can be seen.

The distance between the location of the exit pupil and the last optical component, for example, the eye-piece lens of a visual instrument is called eye relief. The eye relief, together with the exit pupil, defines the freedom of observation, i.e. the volume where the observer's eye can be located with respect to the optical system.

The current invention is especially related to such virtual display systems, where imaging optics are used to create an enlarged virtual image from the smaller sized real image created by an image source, typically by an integrated circuit display chip. The invention is not limited only to microdisplay-based systems, but can also be used in other virtual display systems. Besides display systems, the invention may in its generic form be utilized in other type of optical systems as well, where different wavelengths of light are treated in a sequential manner.

Document WO 99/52002 discloses optical devices, in which a plurality of holographic optical elements (HOEs), i.e. diffractive grating elements are arranged on a common planar light-transmittive substrate. These devices may be used for magnifying the exit pupil of the imaging optics, which produces a virtual image at infinity from a real image source, and to further reflect this virtual image into the eye of an observer.

Accompanying FIG. 1 hereof, which corresponds to FIG. 5 in WO 99/52002, illustrates an optical system composed of three successive HOEs to magnify the exit pupil of a virtual display. First HOE $H_1$, onto which the light from the optics of the input display 2 is incident, couples the light into a glass substrate 6 and expands the light distribution in one direction. The second HOE $H_2$ redirects the light distribution in the other direction, and the third HOE $H_3$ then couples the light from the substrate 6 outwards. Thus, the aforementioned optical system operates as a beam-expanding device, which maintains the direction of the light beam. The virtual image can be thus observed through this enlarged exit pupil. FIG. 2, which corresponds to FIG. 4 in WO 99/52002, shows schematically in a three dimensional view the location of the three HOEs $H_1$, $H_2$ and $H_3$ on the substrate 6.

The enlargement of the exit pupil of a virtual display system with a beam-expending optical configuration, such as with those described in the aforementioned document WO 99/52002, results in larger eye relief, which makes the virtual display device more convenient to use. A significantly larger eye relief allows to move the display device further away from the immediate vicinity of the observer's eyes. This makes it possible to observe the virtual display in a manner resembling the use of an ordinary display panel reproducing real images.

Therefore, there is significant interest in optical beam expansion systems, which can be used to enlarge the diameter of the exit pupil, and further also the eye relief in virtual display systems. These optical beam expansion systems are hereafter also called exit pupil extenders (EPEs).

However, prior art solutions for EPEs based on the use of holographic/diffractive grating elements (HOEs, or DOEs, i.e. diffractive optical components) in a manner described in the document WO 99/52002 have certain significant limitations, which in practice degrade the quality of the reproduced virtual images. One of these limitations is the fact that the colour uniformity of the image cannot be maintained during the enlargement of the exit pupil.

FIG. 3 describes schematically the paths of light of two distinct wavelengths in a prior art type diffractive grating element 30, which can be used to expand a light beam in one direction. Another grating element 30 could be applied to expand the light beam in the other direction, for example in a manner shown in FIGS. 1 and 2, and therefore to be used to build an EPE. The diffractive grating element 30 presented in FIG. 3 could be utilized, for example, as the final element coupling the light towards the observer through a display window, i.e. the element $H_3$ in FIGS. 1 and 2.

In the grating element 30, a diffractive grating structure H, i.e. a surface relief consisting of parallel diffractive grooves, diffracts light into the substrate 6, where the light is trapped due to total internal reflection (TIR). At the upper surface TIR is complete, but at the lower surface, which has a grating structure, part of the light can be diffracted out from the substrate 6. This outgoing light has exactly opposite direction, independently from wavelength, with respect to the incoming light. The diffraction angle is governed in this case by the well known formula $$\sin(\theta_i) - n \cdot \sin(\theta_m) = m\frac{\lambda}{d} \quad (1)$$

where d is the grating period
λ is the wavelength
n is refractive index of the waveguide
m is the diffraction order
$\theta_j$ is the angle of incidence
$\theta_m$ is the angle of diffraction of m:th order As can be seen from this formula, the diffraction angle increases with wavelength. As a result, the interval (L) between two successive TIRs depends on wavelength, being longer with longer wavelength.

The distribution of light in the η-direction becomes different for different wavelengths. For example, blue light with shorter wavelength ($\lambda_1$) experiences more "hits" with the diffractive grating structure H than red light with longer wavelengths ($\lambda_2$). In other words $L_2 > L_1$ as depicted in FIG. 3. Consequently, for example the primary colours red, green and blue for a RGB-type display become each diffracted in a slightly different manner, which results as an uneven colour distribution for the light exiting through the diffractive grating structure H. In other words, the output "display" will in the η-direction become reddish at one end and bluish at the other.

In practice, the diffraction efficiency of the surface grating structure H might be designed to have different local values in the η-direction in order to create an essentially constant light output intensity to compensate for the fact, that the light energy remaining inside the substrate 6 decreases in said η-direction when interacting with the grating structure H. This method, which is known from the prior art, is, however, not capable of compensating for the uneven color distribution explained above.

SUMMARY OF THE INVENTION

The main purpose of the current invention is to present a novel, electrically tunable diffractive grating element. This device according to the invention is especially suitable for beam expansion purposes for example in EPEs and virtual display devices, and does not suffer from the aforementioned problems related to the prior art solutions. A specific aim of the invention is to make it possible to construct virtual display systems, where good color uniformity over the whole area of the exit pupil of the display can be maintained and thus high image quality is achieved.

The basic gist of the invention is to substitute the diffractive grating structure having a permanently shaped surface relief with an electrically tunable diffractive grating structure. The grating structure according to the invention comprises a preformed, basic diffractive surface relief composed of dielectric and deformable viscoelastic material. This preformed grating structure can be electrically and sequentially fine tuned in shape to adjust the diffraction properties of said grating individually for different wavelengths. In sequential colour virtual displays this fine tuning allows compensation for the different diffraction properties of the grating, i.e. the diffractive grating is sequentially fine tuned to operate optimally for each of the sequential primary colours, for example red, green and blue. Thus, good colour uniformity is achieved.

One specific object of the invention is thus to allow manufacture of virtual display devices with a significantly larger exit pupil diameter than prior art solutions without degrading the color uniformity of the display device. In prior art solutions the color non-uniformity increases along the length of the diffractive element H, because for those light waves experiencing the highest number of reflections from said element, also the angular effect causing color non-uniformity is most serious. Along with larger exit pupil diameters, also a significantly larger eye relief can be achieved.

The preferred embodiments of the invention and their benefits will become more apparent to a person skilled in the art through the description and examples given herein below, and also through the appended claims.

DESCRIPTION OF THE DRAWINGS

In the following, the invention will be described in more detail with reference to the appended drawings, in which.

DETAILED DESCRIPTION OF THE INVENTION

Figure 1:
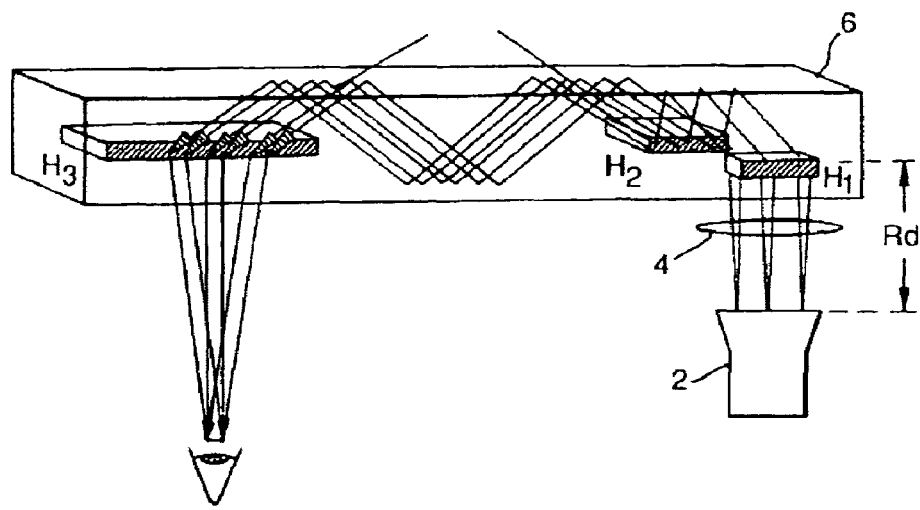
FIG. 1 illustrates schematically a prior art optical system composed of three successive HOEs to enlarge the exit pupil of a device producing a virtual image.

It is to be understood that the drawings mentioned briefly above and described more fully below are designed solely for purposes of illustration and thus, for example, not for showing the various components of the devices in their correct relative scale and/or shape. For the sake of clarity, the components and details which are not essential in order to explain the spirit of the invention have been omitted in the drawings.

Figure 4:
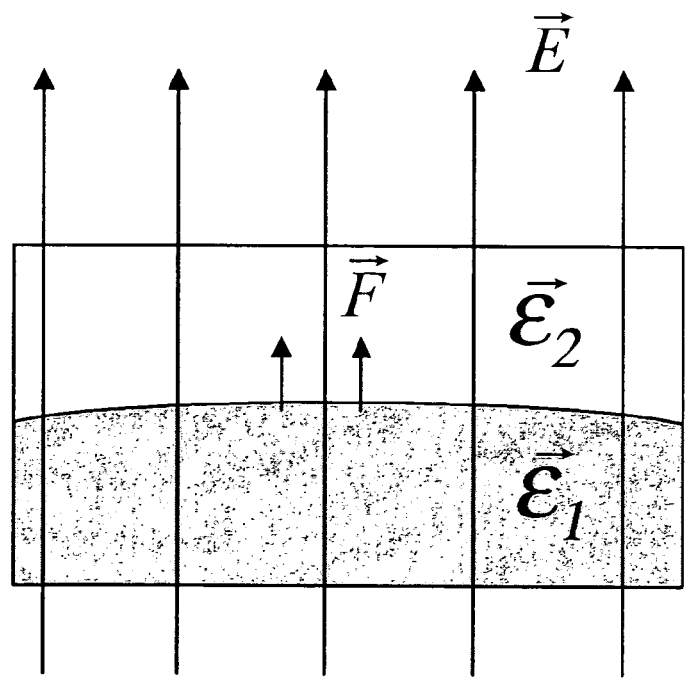
FIG. 4 illustrates schematically force F acting on an interface between substances having different Dielectric properties under the influence of an electric field.

FIG. 4 illustrates schematically the general principle in physics, which can be observed in connection with dielectric substances. "Dielectric substance" can be defined as a substance in which an electric field may be maintained with zero or near zero power dissipation, i.e. the electrical conductivity of the substance is zero or near zero. An electric field E going through an interface where the dielectric constant changes, such as at the interface between air and polymer, causes a force F onto the surface of the dielectric material having the higher dielectric constant. This ponderomotive force F is proportional to the square of the electric field E at that point. In the case of an interface between air and polymer, under the influence of the electric field the ponderomotive force F acts onto the polymer surface into the direction of the air.

Figure 5:
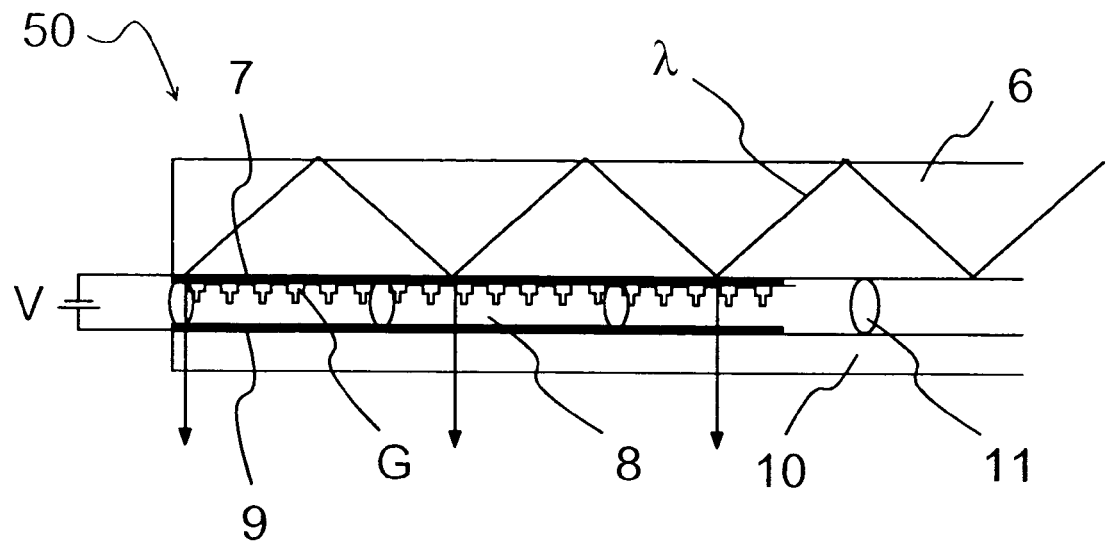
FIG. 5 illustrates an embodiment of the sequentially tunable diffractive grating element according to invention.

FIG. 5 illustrates schematically one possible embodiment of a sequentially tuneable diffractive grating element 50 according to invention. The surface relief acting as the optical diffractive structure G is composed of a preformed layer of dielectric and viscoelastic gel. The preformed gel layer G, for example a polymer layer, is applied onto the waveguide substrate 6 and on a first transparent electrode 7. A gap 8, for example an air gap, is left between the free surface of the viscoelastic layer G and a second transparent electrode 9. The second transparent electrode 9 is formed opposite to the gel layer G on the surface of a transparent front plate 10.

The transparent front plate 10, as well as the transparent waveguide substrate 6 may be for example glass. The transparent first and second electrodes 7,9 are preferably made of indium tin oxide (ITO), as is known in the art. The dimensions of the gap 8 between the deformable gel layer G and the second electrode 9 can be stabilized, for example, using suitable spacers 11 between the waveguide substrate 6 and front plate 10.

Figure 6:
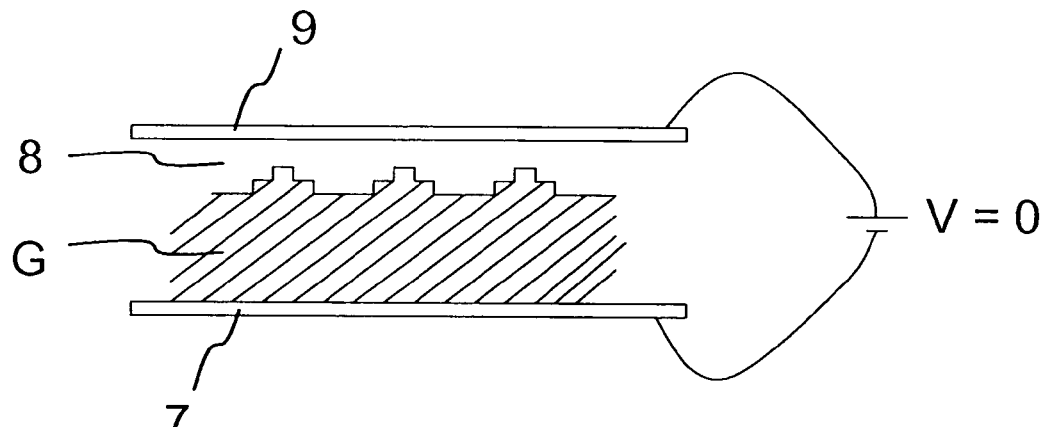
FIG. 6 illustrates in a magnified and simplified view the diffractive grating structure shown in FIG. 5 with the first and second electrodes not activated.
Figure 7:
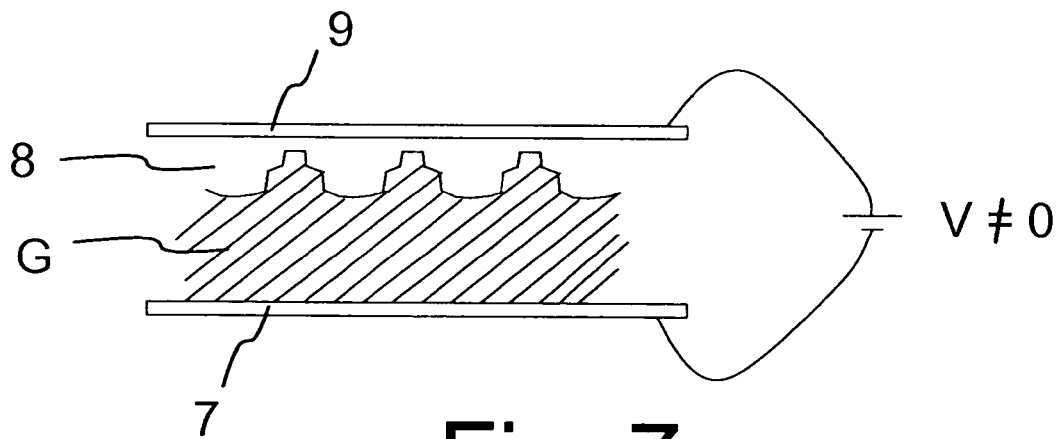
FIG. 7 illustrates in a magnified and simplified view the diffractive grating structure shown in FIG. 5 with the first and second electrodes activated.

FIGS. 6 and 7 describe in more detail the phenomena taking place in the gel layer G when the voltage between the first and second electrodes 7,9 is varied.

FIG. 6 shows schematically the situation when no voltage is applied between the first and second electrodes 7,9. In this situation the light wave λ travelling in the waveguide substrate 6 experiences diffraction due to the permanent surface relief shape fabricated into the gel layer G, when said layer was preformed during the manufacturing of the device. This corresponds basically to the prior art situation, where the properties of the diffractive grating structure H are determined in a permanent manner during the manufacturing of the device.

FIG. 7 shows schematically the situation when a control voltage V is applied between the first and second electrodes 7,9. A control voltage between said electrodes 7,9 creates an electric field through the two dielectric layers, i.e. through the air gap 8 and the gel layer G. The ponderomotive force generated by the electric field affects the surface interface between said dielectric layers, and further modifies the surface relief on the free surface of the gel layer G.

The electric field generated between the gel layer G and the opposite second electrode 9 is inhomogeneous over the gel layer G surface; the electric field is strongest in those parts of the gel layer G which are closest to the second electrode 9, i.e. the gap 8 has its minimum thickness. Therefore, the force acting onto the surface of the gel layer G is inhomogeneous as well and a deformation of the preformed surface shape can be observed. In other words, those parts of the gel layer G where the preformed thickness of said layer is highest (gap 8 is smallest), are drawn towards the air gap 8 and the second electrode 9 stronger than the "valleys" which have smaller gel material thickness. Because of this, a certain amount of gel material flow takes place in the gel layer G, since most suitable polymer materials are substantially uncompressible and cannot therefore simply change in volume under the effect of the electric field.

The diffraction amplitude, i.e. the height profile of the gel layer surface relief affects the optical diffraction properties of the grating structure G and now, according to the invention, in a sequential colour system the properties of the electrically deformable grating structure G can be fine tuned sequentially in time and separately for each primary color in order to obtain desired diffraction properties for the grating structure G, and subsequently to obtain good color uniformity. In other words, different control voltages V are used sequentially for each primary color to adjust the diffraction properties of the deformable gel layer G wherein the diffraction properties of the surface relief of the viscoelastic layer are arranged to be substantially similar for all of the given wavelengths of the light wave.

The embodiments of the invention can be extended to devices where the air gap 8 is replaced with a gap formed from some other suitable gas or even vacuum. Suitable dielectric and viscoelastic materials for the preformed gel layer G include, for example, silicone gel, various polymer materials or other suitably viscous substances that have a tendency to deform when placed in a presence of an electric field, and which materials can be preformed to have a certain substantially permanent surface relief shape.

The transparent electrode structures required to generate the electric field through the viscoelastic layer G may be made of indium tin oxide (ITO), as is known in the art. Also other methods for creating substantially transparent electrode structures on any substantially transparent substrate material may be employed without departing from the scope of the invention. The waveguiding substrate 6 and the front plate 10 may be glass, but, for example, transparent plastic materials can also be used.

The preferred applications of the invention include different type of virtual display devices, where beam expansion in one or more directions is performed to extend the exit pupil of the display device. In such display devices the image source can be, for example, a sequential color LCOS-device (Liquid Crystal On Silicon), an OLED-device (Organic Light Emitting Diode), a MEMS-device (MicroElectroMechanical System) or any other suitable microdisplay device operating in transmission, reflection or emission.

While the invention has been shown and described above with respect to selected embodiments of virtual display devices, it should be understood that these embodiments are only examples and that a person skilled in the art could construct other embodiments utilizing technical details other than those specifically disclosed herein while still remaining within the spirit and scope of the present invention. It should therefore be understood that various omissions and substitutions and changes in the form and detail of the grating element illustrated, as well as in the operation of the same, may be made by those skilled in the art without departing from the spirit of the invention. It is the intention, therefore, to restrict the invention only in the manner indicated by the scope of the claims appended hereto.

For example, the embodiments of the invention include devices where either one or both of the first 7 and second 9 electrode structures each consist of several electrode zones in order to affect the gel layer G in different parts of the grating element in a different manner. The different electrode zones within an electrode structure may also be connected to several different voltage levels.

The preformed gel layer G may also have different diffraction amplitude, i.e. a different preformed surface shape in different parts of the grating element. Therefore, it is possible to have a diffractive grating element in which the diffraction efficiency varies locally.

Therefore, those optimization parameters for a diffraction grating element 50 according to the invention, that may be selected according to the specific application, include, for example, the preformed shape of the gel layer G, the size, location and mutual distance of the first 7 and second 9 electrodes structures, the number of electrode zones in said electrode structures and the voltage levels applied to said electrode structures/zones.

Figure 2:
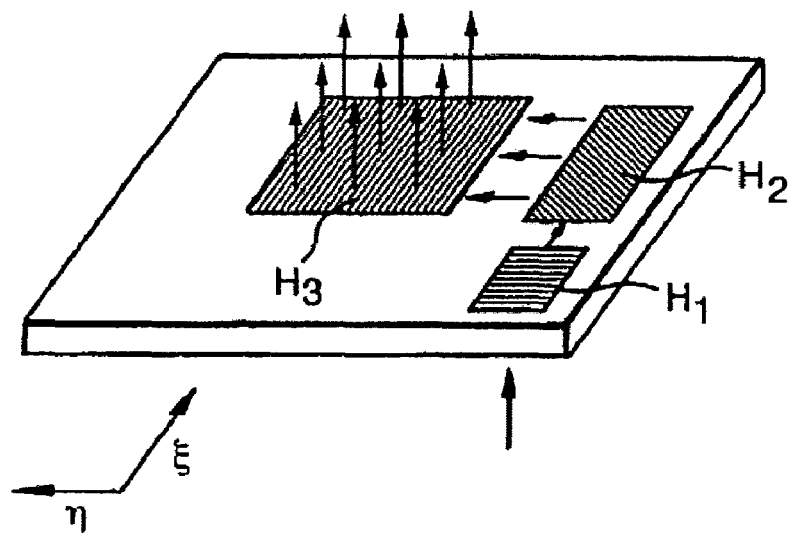
FIG. 2 illustrates schematically in a three dimensional view the arrangement of the HOEs in the optical system shown in FIG. 1.
Figure 3:
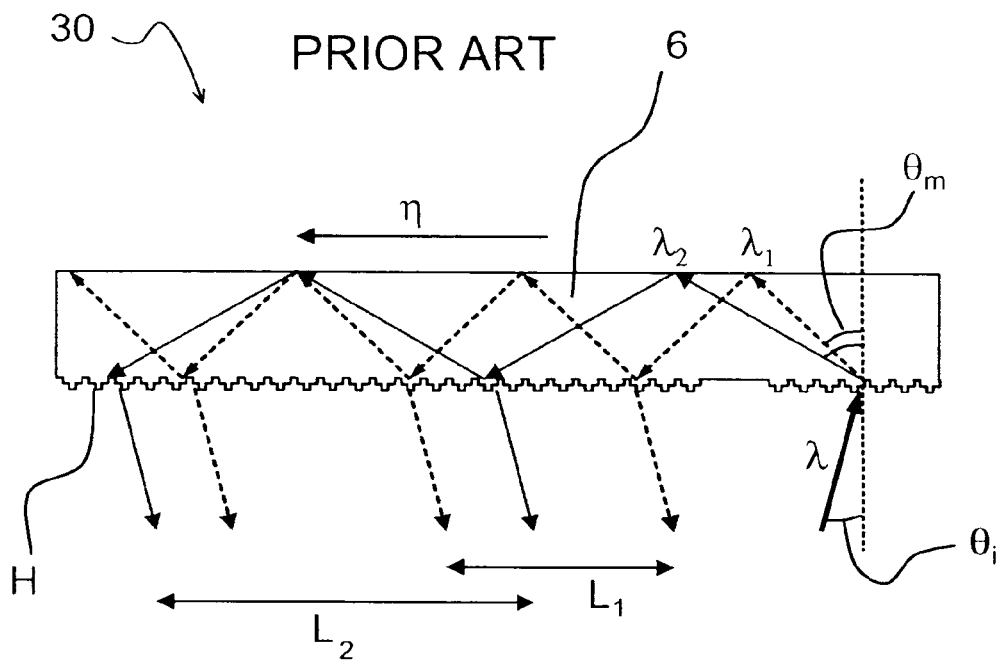
FIG. 3 illustrates schematically the distribution of light in one of the diffractive grating elements of an EPE.

Instead of coupling light out from a substrate material 6, the electrically controlled diffractive grating element 50 may also be used to couple light into the waveguiding substrate material 6 or to fold the light within said substrate material. In other words, the diffractive grating element 50 according to the invention could be used instead of HOE/DOE $H_1$ or HOE/DOE $H_2$ in the EPE described in FIGS. 1 and 2.

The applications of the invention may include, for example, portable Internet appliances, hand-held computers, personal digital assistant devices (PDAs) advanced mobile phones and other mobile stations, digital video and still cameras, wearable computers, computer game devices, specialized bring-to-the-eye products for viewing different types of information or presentations, and other devices including high quality virtual display devices.

The invention may also used in other applications than virtual displays. In principle, the invention is suitable to be used in any application where optical beam expansion in one or more directions is required and different wavelengths of light are treated sequentially in time. Thus, the invention can be applied to different type of optical couplers or other light modulator devices as well.

The invention claimed is:

1. An optical device comprising at least
    a substantially planar waveguiding substrate for guiding a light wave within the substrate in a direction of a substrate plane based substantially on total internal reflections,
    a preformed, diffractive grating structure carried by the waveguiding substrate and arranged to couple energy of the light wave between the substrate and surroundings thereof, wherein said preformed, diffractive grating structure is a preformed surface relief arranged on an electrically deformable dielectric and viscoelastic layer, and that the device further comprises at least
    a first substantially transparent_electrode structure arranged between the waveguiding substrate and the viscoelastic layer,
    a second substantially transparent electrode structure arranged opposite to the viscoelastic layer leaving a dielectric gap towards a free surface of the viscoelastic layer having a surface relief, and
    control module, for applying a control voltage between the first and second electrode structures to generate an electric field passing through an interface between the viscoelastic layer and the dielectric gap in order to electrically deform the surface relief of the viscoelastic layer.

2. The device according to the claim 1, wherein said control module is arranged to electrically deform the surface relief of the viscoelastic layer sequentially in time.

3. The device according to the claim 2, wherein the deformation of the surface relief of the viscoelastic layer is adjusted to produce desired diffraction properties for given wavelengths of the light wave.

4. The device according to the claim 3, wherein the diffraction properties of the surface relief of the viscoelastic layer are arranged to be substantially similar for all of the given wavelengths of the light wave.

5. The device according to claim 1, wherein the material of the viscoelastic layer is a preformable polymer compound.

6. The device according to claim 1, wherein the material of the dielectric gap is air, gas or vacuum.

7. The device according to claim 1, wherein at least one of the first and second electrode structures comprises a single and substantially planar electrode zone.

8. The device according to claim 1, wherein at least one of the first and second electrode structures comprises multiple electrode zones.

9. The device according to claim 1, wherein at least one of the first and second electrode structures is of a light transparent type.

10. The device according to claim 1, wherein the device is arranged to alter at least one cross-sectional dimension of the light wave coupled between the substrate and the surroundings.

11. The device according to the claim 10, wherein multiple devices are arranged on a common waveguiding substrate in order to alter several cross-sectional dimensions of the light wave.

12. The device according to claim 1, wherein the device is arranged to enlarge the exit pupil of an optical system.

13. The device according to claim 1, wherein the device is arranged to enlarge the exit pupil of a virtual display.

14. The device according to claim 1, wherein the device is arranged to enlarge the exit pupil of a sequential color virtual display and the diffraction properties of the viscoelastic layer are arranged to control colour uniformity of said virtual display.

15. A device, comprising:
    a substantially planar waveguiding substrate arranged to guide a light wave within said substrate in a direction of a substrate plane based substantially on total internal reflections in order to provide enlarging of an exit pupil of an optical system,
    a first diffractive grating structure arranged to diffract said light wave between said substrate and surroundings,
    a second diffractive grating structure arranged to diffract said light wave, wherein said second grating structure is a preformed surface relief arranged on an electrically deformable dielectric and viscoelastic layer,
    a first substantially light transparent electrode structure arranged between said substrate and said viscoelastic layer, a second substantially light transparent electrode structure arranged opposite to said viscoelastic layer leaving a dielectric gap towards a free surface of said viscoelastic layer, and a control module for applying a control voltage between said first and second electrode structures to generate an electric field passing through an interface between said viscoelastic layer and said dielectric gap in order to electrically deform the surface relief of said viscoelastic layer.

16. The device according to the claim 15, wherein said control module is arranged to electrically deform the surface relief of the viscoelastic layer sequentially in time.

17. A method, comprising guiding a light wave within a planar waveguiding substrate in a direction of a substrate plane based substantially on total internal reflections, diffracting said light wave by a preformed diffractive grating structure, wherein said preformed diffractive grating structure is a preformed surface relief arranged on an electrically deformable viscoelastic layer having a free surface, and applying an electric field to pass through said free surface in order to electrically deform a surface relief of said viscoelastic layer.

18. The method according to the claim 17, wherein the deformation of the surface relief of the viscoelastic layer is adjusted to produce desired diffraction properties for given wavelengths of the light wave.

19. An optical device comprising at least waveguiding means, for guiding a light wave within said waveguiding means in a direction of a waveguiding means plane based substantially on total internal reflections, means for diffraction carried by the waveguiding means and arranged to couple energy of the light wave between the waveguiding means and surroundings thereof, wherein said means for diffraction is a preformed surface relief arranged on an electrically deformable dielectric and viscoelastic layer, and that the device further comprises at least first electrode means arranged between the waveguiding means and the viscoelastic layer, second substantially transparent electrode means arranged opposite to the viscoelastic layer leaving a dielectric gap towards a free surface of the viscoelastic layer having a surface relief, and control means, for applying a control voltage between the first and second electrode means to generate an electric field passing through an interface between the viscoelastic layer and the dielectric gap in order to electrically deform the surface relief of the viscoelastic layer.

20. The device according to the claim 15, wherein said waveguiding means is a substantially planar waveguiding substrate and said means for diffraction is a preformed diffractive grating structure.

* * * * *

UNITED STATES PATENT AND TRADEMARK OFFICE
CERTIFICATE OF CORRECTION

| | | |
|---|---|---|
| PATENT NO. | : 7,184,615 B2 | Page 1 of 1 |
| APPLICATION NO. | : 10/666926 | |
| DATED | : February 27, 2007 | |
| INVENTOR(S) | : Tapani Levola | |

It is certified that error appears in the above-identified patent and that said Letters Patent is hereby corrected as shown below:

The reference US-2001/0052956 12/2001, Lee, et al, Classification 349/123 should be added to the references in the letters patent.

Signed and Sealed this

Eleventh Day of December, 2007

JON W. DUDAS
*Director of the United States Patent and Trademark Office*